United States Patent
Scholz et al.

(10) Patent No.: US 11,679,710 B2
(45) Date of Patent: Jun. 20, 2023

(54) DEVICE FOR ADJUSTING A SUPPORTING FRAME OF A HEADLIGHT

(71) Applicant: HELLA GMBH & CO. KGAA, Lippstadt (DE)

(72) Inventors: Sebastian Scholz, Soest (DE); Ralf Seiger, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/581,462

(22) Filed: Jan. 21, 2022

(65) Prior Publication Data
US 2022/0234492 A1    Jul. 28, 2022

(30) Foreign Application Priority Data
Jan. 22, 2021    (DE) .................... 10 2021 101 339.9

(51) Int. Cl.
*B60Q 1/068*    (2006.01)
*B60Q 1/076*    (2006.01)

(52) U.S. Cl.
CPC ............. *B60Q 1/076* (2013.01); *B60Q 1/068* (2013.01); *B60Q 2200/30* (2013.01)

(58) Field of Classification Search
CPC .... B60Q 1/068; B60Q 1/0683; B60Q 1/0686; B60Q 2200/30; B60Q 2200/32; B60Q 2200/34; B60Q 2200/36; B60Q 2200/38
See application file for complete search history.

(56) References Cited

U.S. PATENT DOCUMENTS

| | | | |
|---|---|---|---|
| 5,508,896 A | 4/1996 | Suehiro et al. | |
| 6,773,152 B2 | 8/2004 | Ruckwied | |
| 7,635,211 B2 | 12/2009 | Kusagaya | |
| 7,658,522 B2 | 2/2010 | Kuwuhara et al. | |
| 7,914,186 B2 | 3/2011 | Tatara et al. | |
| 11,142,117 B2 | 10/2021 | Li et al. | |
| 11,148,581 B2 | 10/2021 | Li et al. | |
| 2004/0066657 A1* | 4/2004 | Casses | B60Q 1/0683 362/523 |
| 2004/0090786 A1* | 5/2004 | Floyd | B60Q 1/06 362/460 |
| 2014/0003080 A1* | 1/2014 | King | B60Q 1/0683 362/525 |

FOREIGN PATENT DOCUMENTS

| | | |
|---|---|---|
| DE | 4446978 A1 | 7/1995 |
| DE | 19514994 C1 | 5/1996 |

(Continued)

*Primary Examiner* — Robert J May
(74) *Attorney, Agent, or Firm* — Muncy, Geissler, Olds & Lowe, P.C.

(57) ABSTRACT

A device for adjusting a supporting frame of a headlight of a motor vehicle, comprising a first coupling element, a second coupling element, and a guide element, wherein the second coupling element is pivotable relative to the first coupling element, wherein the first coupling element has a receiving region for a spherical segment-shaped region of the second coupling element, wherein the region is secured in a positive manner in the receiving region, wherein the region is secured to the supporting frame, wherein the first coupling element is guided in the guide element so as to be displaceable in at least one first direction.

10 Claims, 1 Drawing Sheet

(56) References Cited

FOREIGN PATENT DOCUMENTS

| | | |
|---|---|---|
| DE | 10219874 A1 | 9/2003 |
| DE | 102007047683 A1 | 4/2008 |
| DE | 102007053081 B4 | 5/2008 |
| DE | 102007053431 A1 | 5/2008 |
| WO | WO2018108102 A1 | 6/2018 |

* cited by examiner

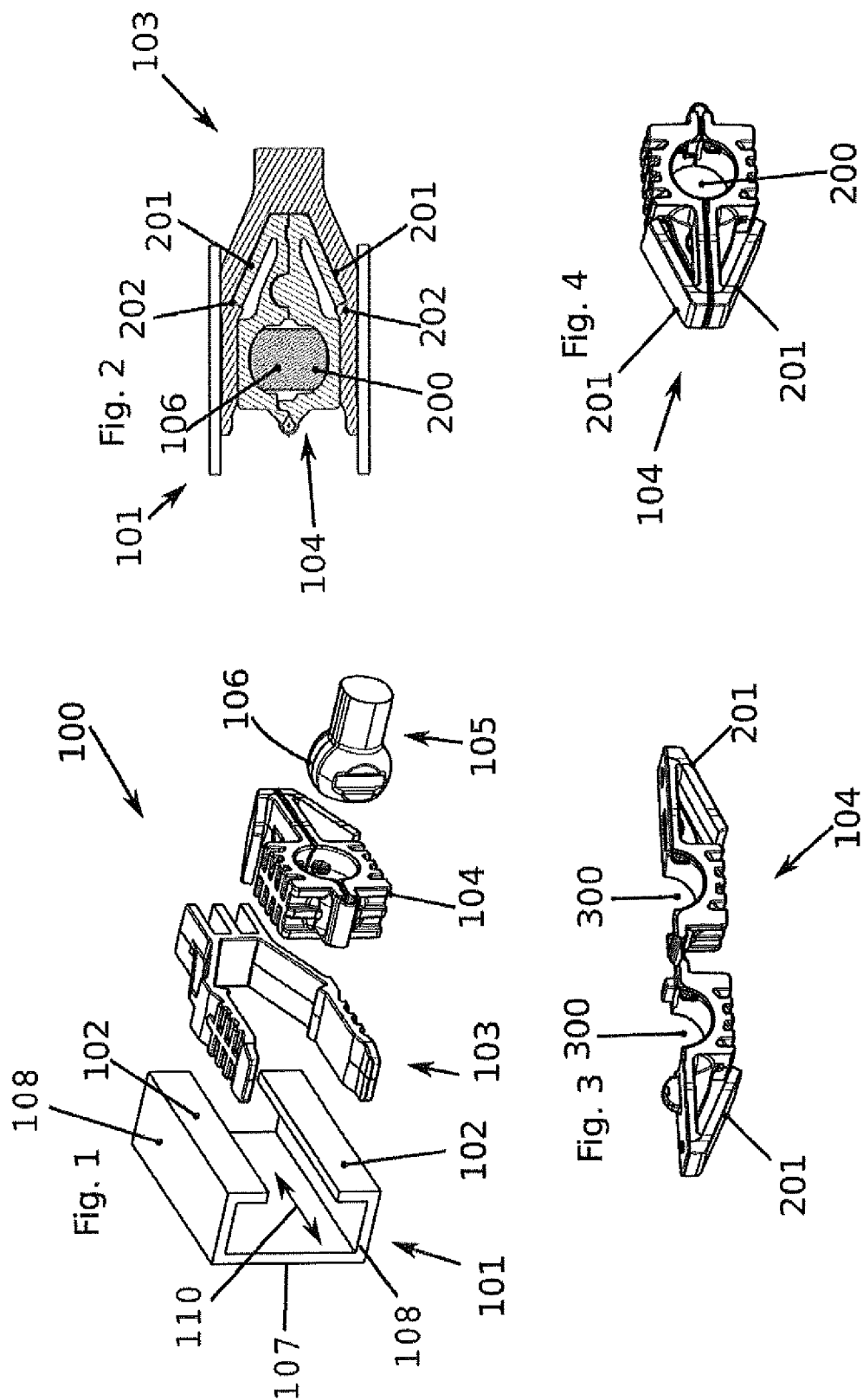

DEVICE FOR ADJUSTING A SUPPORTING FRAME OF A HEADLIGHT

This nonprovisional application claims priority under 35 U.S.C. § 119(a) to German Patent Application No. 10 2021 101 339.9, which was filed in Germany on Jan. 22, 2021, and which is herein incorporated by reference.

BACKGROUND OF THE INVENTION

Field of the Invention

The present invention relates to a device for adjusting a supporting frame of a headlight of a motor vehicle.

Description of the Background Art

In the context of this description, a supporting frame can be understood to mean, in particular, a component in which the headlight is mounted. An adjustment of the headlight can thus also be achieved by an adjustment of the supporting frame.

Various devices for adjusting the supporting frame are known from the prior art. A device is known from WO 2018/108102 A1 in which the supporting frame can be adjusted using a ball joint.

SUMMARY OF THE INVENTION

It is therefore an object of the present invention to provide a device that requires less installation space. In addition, a method for assembling such a device and a headlight with such a device are to be provided.

The device comprises a first coupling element, a second coupling element, and a guide element. The second coupling element is pivotable relative to the first coupling element. The first coupling element has a receiving region for a spherical segment-shaped region of the second coupling element. The region is secured in a positive manner in the receiving region. The region is also secured to the supporting frame, in particular directly. This includes the possibility that the region is part of the supporting frame. The first coupling element is guided in the guide element so as to be displaceable in at least one first direction. For example, the first coupling element can be guided indirectly in the guide element. In this case, it can be secured, for example, to another component that is guided in the guide element.

Due to the displaceability of the first coupling element and the pivotability of the second coupling element relative to the first coupling element, the supporting frame can be pivoted by a linear movement of the first coupling element. As a result, the installation space required by the device, especially in the horizontal direction perpendicular to the first direction, is particularly small. If the device is used, for example, to pivot the supporting frame in the transverse direction of the motor vehicle, the linear movement can take place in the longitudinal direction. In the context of this description, the longitudinal direction is understood to mean the direction in which the motor vehicle is moved during normal use without a steering angle. The transverse direction runs in the horizontal direction perpendicular to the longitudinal direction.

The first direction can run perpendicular to a geometric pivot axis about which the second coupling element is pivotable. In the context of this description, a geometric axis is understood to mean in particular an axis that is not present as a component, but merely serves to define the orientation and/or mode of operation of the components.

A displacement of the first coupling element in the first direction can automatically trigger a pivoting movement of the second coupling element. This is possible in particular if an end that is opposite a second coupling element end that is displaceable in the first direction cannot be displaced linearly. The end that is not linearly displaceable can be secured in particular directly to the support frame.

The device can comprise a connecting element which is guided in the guide element. The first coupling element can be secured to the connecting element in a positive manner, in particular by means of a snap-in connection. The use of the connecting element can in particular simplify the assembly of the device, because the first coupling element then only has to be secured to the connecting element in order to achieve the desired displaceability in the first direction.

The first coupling element can be displaceable exclusively in the first direction. This is understood in particular to mean that it can be pushed both forwards and backwards in the first direction. This is understood as a positive and a negative movement in the first direction. This can mean in particular that a displacement of the first coupling element in another direction is impossible. This can be achieved, for example, in that the first coupling element can be displaced in the guide element and the guide element only allows the connecting element to be displaced in a single direction.

The first coupling element can have a first part, a second part, and a hinge with a geometric hinge axis. The geometric hinge axis in this case can be understood to mean in particular an axis that does not have to be present as a component, but merely serves to define the movement of the hinge. The hinge can be a film hinge, for example. The first part can be connected to the second part via the hinge. The first part can be pivotable relative to the second part about the hinge axis from a first state to a second state and vice versa. This applies in particular to the state of the first coupling element before use in the device, therefore, for example, during assembly. It is possible that the first part cannot be pivoted in the state of the first coupling element when it is installed in the device, because this pivoting movement is blocked, for example, by the guide element or the connecting element. It is possible that the first coupling element can be secured to the connecting element only in the first state of the first part and has the receiving region only in the first state of the first part.

The guide element can have a C-shape in cross section. In the context of this description, the C-shape is understood in particular to mean that two legs extend parallel to one another in the same direction from two ends of a base side. The two legs can in particular have the same length. In this case, for example, the connecting element can be guided by the base and the two legs.

The connecting element can be inserted into the guide element. In addition, the spherical segment-shaped region is inserted into the receiving region. This can be done, for example, in that the first part of the first coupling element is pivoted about the spherical segment-shaped region and is thus transferred from the first state to the second state. The first coupling element is then pushed into the connecting element and secured to the connecting element. The first coupling element can be secured to the connecting element, for example, by pushing the first coupling element into the connecting element until a snap-in connection is formed between the first coupling element and the connecting element.

This assembly is particularly simple, especially because the first coupling element can be secured to the connecting element by the pivoting movement of the first part. In addition, a prepositioning of the second coupling element is already achieved by the arrangement of the area in the receiving region. A precise adjustment can then take place afterwards.

The headlight comprises a first and a supporting frame. A pivoting of the second coupling element of the first device triggers a pivoting of the supporting frame. It is possible in particular that the pivoting of the supporting frame takes place in the same direction as the pivoting of the second coupling element. The pivoting is then brought about at the same time by the two second coupling elements.

The headlight can comprise a second device according to one embodiment of the invention. The second coupling element of the first device in this case can be secured to a first horizontal end of the supporting frame. The second coupling element of the second device can be secured to a second horizontal end of the supporting frame. In this case, a first pivoting of the second coupling element of the first device can be coupled to a second pivoting of the second coupling element of the second device.

It is particularly advantageous if, in the case of the first device, the first coupling element can be displaced at least to a small extent in a second direction, which is perpendicular to the first direction in the horizontal direction, and in the case of the second device, the first coupling element is displaceable only in the first direction. The displaceability of the first coupling element of the first device in the second direction can then be used to compensate for tolerances and/or to enable a partial circular movement of the first coupling element that is necessary when the supporting frame is pivoted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a schematic exploded diagram of a device according to an exemplary embodiment of the invention;

FIG. 2 shows a schematic sectional view of the device from FIG. 1;

FIG. 3 shows a schematic perspective diagram of the first coupling element from FIG. 1 in an open state; and FIG. 4 shows a schematic perspective diagram of the first coupling element from FIG. 3 in a closed state.

DETAILED DESCRIPTION

Device 100 comprises a guide element 101, a connecting element 103, a first coupling element 104, and a second coupling element 105. Connecting element 103 is guided in guide element 101. Connecting element 103 is connected to first coupling element 104 via a positive connection. First coupling element 104 has a receiving region 200 for a spherical segment-shaped region 106 of second coupling element 105. In the assembled state, spherical segment-shaped region 106 is disposed in a positive manner in receiving region 200, so that a linear displacement of first coupling element 104 causes a pivoting of second coupling element 105. A supporting frame (not shown in the figures) of the headlight is secured to second coupling element 105 and is also pivoted when second coupling element 105 is pivoted. It is also possible that second coupling element 105 is part of the supporting frame.

The supporting frame of the headlight can thus be adjusted by linearly displacing connecting element 103 in guide element 101. This results in a linear displacement of first coupling element 104 and thus in a pivoting of second coupling element 105 and the supporting frame.

To guide connecting element 103, the guide element has a base side 107. At two opposite ends of base side 107, one leg 108 each extends perpendicularly away from the base side. A guide 102 each extends from this leg 108 parallel to base side 107. Connecting element 103 is thus guided both by the base side and by legs 108 and also by guide 102. The only thing that remains for connecting element 103 is the displaceability in two opposing directions along linear path 110.

The use of two devices according to one embodiment of the invention is particularly advantageous. In this regard, a first device 100 can be constructed as shown in the figures. The second device can be constructed in the same way, with one exception. The exception is the design of guide element 101. In the second device, guide element 101 can be formed without a guide 102, so that a displacement of connecting element 103 of the second device is possible in a direction perpendicular to the directions in which connecting element 103 of first device 100 can be displaced. This has the advantage that tolerances can be compensated. In addition, second coupling element 105 is moved on a partial circular path when it is pivoted. This is only made possible by the movement of connecting element 103 of the second device away from base side 107 or towards base side 107.

The positive connection between first coupling element 104 and connecting element 103 can best be understood when looking at FIG. 2. It is shown there how two elastically deformable securing component 201 of first coupling element 104 engage behind two projections 202 of connecting element 103. During assembly, the connection is established by pushing first coupling element 104 into connecting element 103. Here, securing component 201 can be elastically deformed until they engage behind projections 202. Behind projections 202, securing component 201 then forms the positive connection with projections 202.

First coupling element 104 can be transferred from an open state in FIG. 3 to a closed state in FIG. 4. This can be achieved in that a first part of first coupling element 104 is connected to the second part of first coupling element 104 via a hinge. In the open state, both the first part and the second part each have a partial region 300 of receiving region 200, said partial region being semicircular in cross section. Receiving region 200 only exists when first coupling element 104 is closed. During assembly, spherical segment-shaped region 106 of second coupling element 105 is inserted into one of the partial regions 300. First coupling element 104 is then closed, so that the spherical segment-shaped region 106 is held in a positive manner in receiving region 200 and can thereby be pivoted relative to first coupling element 104.

When assembling the entire device 100, connecting element 103 is pushed into guide element 101. First coupling element 104 is then pushed into connecting element 103 until the positive connection between securing component 201 and projections 202 is formed. In this step, the spherical segment-shaped region 106 is already held in a positive manner in receiving region 200.

For an adjustment of the supporting frame, only connecting element 103 then has to be displaced linearly in guide element 101.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for adjusting a supporting frame of a headlight of a motor vehicle, the device comprising:
    a first coupling element;
    a second coupling element; and
    a guide element,
    wherein the second coupling element is pivotable relative to the first coupling element,
    wherein the first coupling element has a receiving region for a spherical shaped segment of the second coupling element,
    wherein the spherical shaped segment is secured in a positive manner in the receiving region, and
    wherein the first coupling element is guided in the guide element so as to be displaceable in two opposing directions along at least a first linear path.

2. The device according to claim 1, wherein the first linear path runs substantially perpendicular to a geometric pivot axis about which the second coupling element is pivotable.

3. The device according to claim 1, wherein a displacement of the first coupling element along the first linear path automatically triggers a pivoting movement of the second coupling element.

4. The device according to claim 1, further comprising a connecting element that is guided in the guide element, wherein the first coupling element is secured to the connecting element in a positive manner or by a snap-in connection.

5. A method for assembling the device according to claim 4, the method comprising:
    inserting the connecting element into the guide element;
    inserting the spherical shaped segment of the second coupling element into the receiving region of the first coupling element; and then
    pushing the first coupling element into the connecting element and securing the first coupling element to the connecting element.

6. The device according to claim 1, wherein the first coupling element is displaceable exclusively along the first linear path.

7. The device according to claim 1, wherein the first coupling element has a first part, a second part, and a hinge with a geometric hinge axis, wherein the first part is connected to the second part via the hinge, wherein the first part is pivotable relative to the second part about the hinge axis from a closed state to an open state and vice versa, and wherein the first coupling element is secured to the connecting element only in the closed state of the first part and the second part and the receiving region is formed only in the closed state of the first part and the second part.

8. The device according to claim 1, wherein the guide element has a C-shape in cross section.

9. A headlight for a motor vehicle, comprising:
    a first device corresponding to the device of claim 1.

10. The headlight according to claim 9 further comprising a second device corresponding to the device of claim 1.

* * * * *